United States Patent [19]

Blumentrath

[11] Patent Number: 5,333,963
[45] Date of Patent: Aug. 2, 1994

[54] SHAFT COUPLER

[75] Inventor: Fred Blumentrath, Burlington, Canada

[73] Assignee: 886 496 Ontario Inc., Ontario, Canada

[21] Appl. No.: 945,496

[22] Filed: Sep. 16, 1992

[30] Foreign Application Priority Data

Jan. 22, 1992 [CA] Canada .................................. 2059839

[51] Int. Cl.[5] .............................................. F16D 1/00
[52] U.S. Cl. .................... 403/301; 403/337; 403/11
[58] Field of Search ................. 403/336, 337, 335, 11, 403/301, 306, 312, 356

[56] References Cited

U.S. PATENT DOCUMENTS

| | | | |
|---|---|---|---|
| 1,182,905 | 5/1916 | Hamilton et al. | 464/104 |
| 2,220,799 | 11/1940 | Edwards | 464/105 |
| 2,250,448 | 7/1941 | Edwards | 403/337 |
| 2,643,145 | 6/1953 | Sundbom et al. | 287/111 |
| 2,748,578 | 6/1956 | Potts | 403/11 |
| 3,149,481 | 9/1964 | Peirce, Jr. | 464/182 |
| 3,554,589 | 1/1971 | Boggs | 287/111 |
| 4,171,627 | 10/1979 | Fukuda | 464/117 |
| 4,274,755 | 6/1981 | Bernasconi | 403/337 |

FOREIGN PATENT DOCUMENTS

| | | | |
|---|---|---|---|
| 232458 | 2/1961 | Australia | 403/337 |
| 1108015 | 12/1961 | Fed. Rep. of Germany . | |
| 3416343 | 11/1985 | Fed. Rep. of Germany . | |
| 3933154 | 4/1990 | Fed. Rep. of Germany . | |
| 577645 | 7/1976 | Switzerland . | |
| 996382 | 6/1965 | United Kingdom | 403/337 |

Primary Examiner—P. Austin Bradley
Assistant Examiner—Rex E. Pelto
Attorney, Agent, or Firm—Stevens, Davis, Miller & Mosher

[57] ABSTRACT

The invention relates to a coupling for fixedly, i.e. non-flexibly, connect free ends of two shaft together. The connection is releasable. A typical field of application is in pumps. The coupling has one generally cylindric, solid muff adapted to be fixedly secured to one shaft. The other muff is split in two, along a plane parallel with the axis of the respective shaft. All parts are made free of play when they are secured to the shafts. The invention facilitates maintenance work, e.g. in replacement of packing rings in a pump. It also facilitates the manufacture of the coupling.

7 Claims, 3 Drawing Sheets

1

SHAFT COUPLER

BACKGROUND OF THE INVENTION

The invention relates to a coupling for fixedly but releasably connecting a driver shaft to a driven shaft, for instance a motor shaft to a pump shaft.

The coupling to which the invention pertains is of the type adapted to fixedly secure the two shafts to each other in alignment, and to allow the disassembling of the coupling in order to disconnect the shafts. The coupling of this type is used in applications where disconnection of an otherwise solid shaft train is required. A typical example is a motor driven pump, where replacement of seals or other maintenance operations are periodically required. The coupling is not to be confused with flexible couplings adapted to accommodate certain misalignment between the driving and driven shaft without substantially impairing the transmission of torque between the two.

DESCRIPTION OF THE DRAWINGS

Prior art and the present invention are shown diagrammatically in the accompanying simplified, not-to-scale drawings, wherein.

SUMMARY OF THE INVENTION

Figure 1:
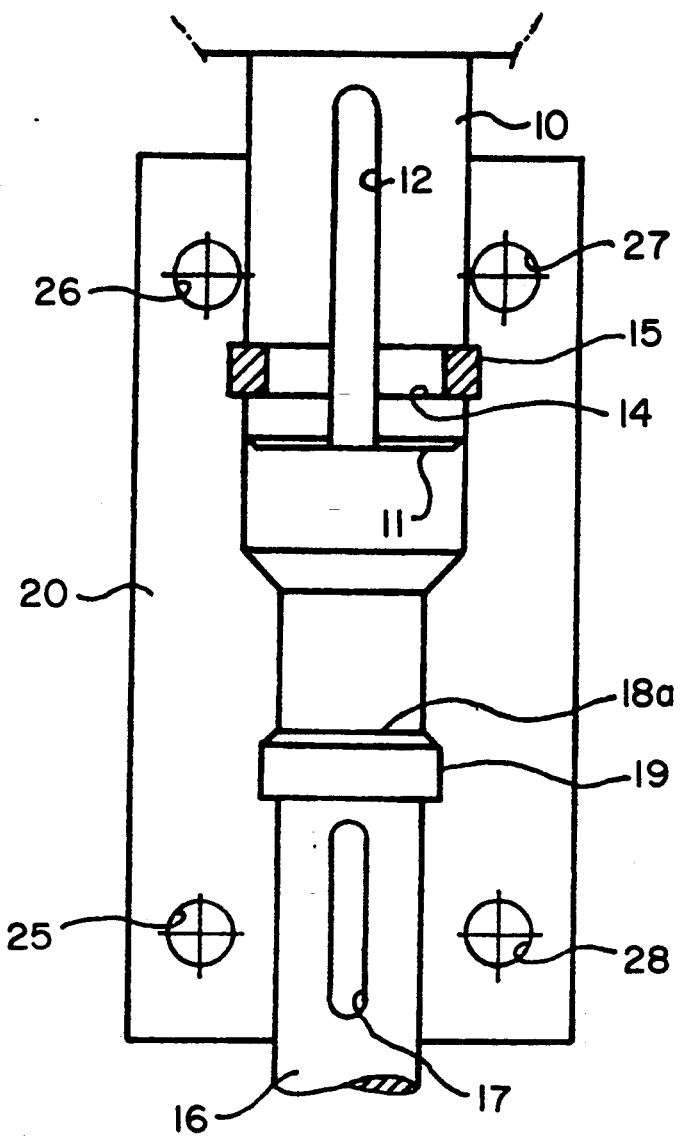
FIG. 1 is a diagrammatic representation of the known type of a rigid coupling.
Figure 2:
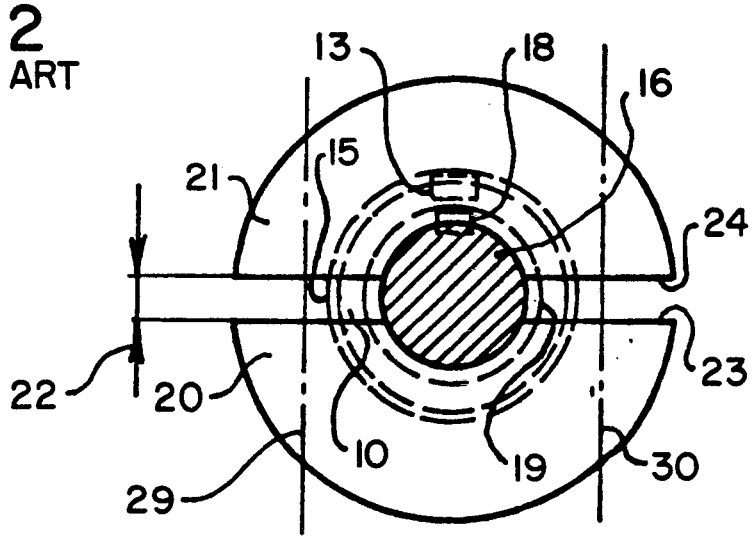
FIG. 2 is a simplified bottom view of the representation of FIG. 1.

Reference is first made to the representation of FIGS. 1 and 2 showing prior art. The representation of FIGS. 1 and 2 is a "split-muff" coupling most often used in an in line pump arrangement.

Reference numeral 10 is a driver shaft having a free end face 11 and a keyway 12 which holds a key 13 visible only in FIG. 2 and omitted from FIG. 1. Mounted in a peripheral groove 14 of the driver shaft 10 is a split thrust washer 15. The pump shaft 16 is a driven shaft provided with a keyway 17 which accommodates a key 18. The free end face of the driven shaft 16 is designated by number 18a. The free end portion of the driven shaft 16 has an increased diameter portion 19 which is in fact a disk-shaped extension provided with a stem threaded in an axial bore in the shaft 16. The actual structure is indicated in greater detail in FIG. 3.

The two shafts 10, 16 are coupled to each other by a split muff having a first half and a second half 20, 21, (FIG. 2) respectively. The first half 20 includes a longitudinal, generally semi-cylindrical cavity compatible with the radii of the shafts 10, 16, inclusive of the split thrust washer 15 of the shaft 10 and the enlarged diameter section 19 of the shaft 16. Thus, when the first half-muff 20 is engaged with the outer surface of the shafts 10, 16, the engagement of the half muff 20 with the washer 15 and with the enlarged diameter section 19 maintains the free end faces 11, 18a at a predetermined axial spacing from each other.

The second half-muff 21 is identical in shape with the first muff 20 except for keyways required to interlock the half-muff 21 with the keys 13 and 18.

The two half-muffs are so machined, that upon clamping the two shafts 10, 16 therebetween a gap 22 remains between the planar faces 23 and 24 of the two half muffs 20, 21. There are four threaded bores 25, 26, 27 and 28 (indicated only in FIG. 1) in the first half-muff 20. They accommodate clamping bolts, not shown, passing through four clamping bolt passages machined in the second half muff 21. The passage and location of the bolts and bores is indicated diagrammatically in FIG. 2 by two axes 29, 30, each representing two bolts engaged in threaded bores 25-26 and 28-27, respectively.

The purpose of the split muff coupling is to maintain the shafts 10, 16 in an axial alignment. This task is fulfilled only when a uniform torque is applied at each of the four clamping bolts. Even relatively small deviations from the uniformity of torque results in unacceptable misalignments between the two axes.

While it may be possible to properly align the two shafts 10, 16 at the production plant, the task is usually more difficult on site, where assembling and disassembling of the coupling, e.g. on replacement of packing in the pump, is often required. Misalignments may be discovered but are very difficult to remove by selective tightening or loosening of the appropriate bolts. Thus the realignment of the shafts 10, 16 may take considerably longer than the exchange of the packing. The main reason for the difficulty is that it is virtually impossible for the maintenance crew to determine the point at which the misalignment between shafts 10, 16 occurs. The adjustment is therefore a lengthy trial-and-error operation. An example of a coupling of this type is described in U.S. Pat. No. 3,554,589, issued Jan. 12, 1971 to L. R. Boggs.

DESCRIPTION OF THE PREFERRED EMBODIMENT(S)

Figure 3:
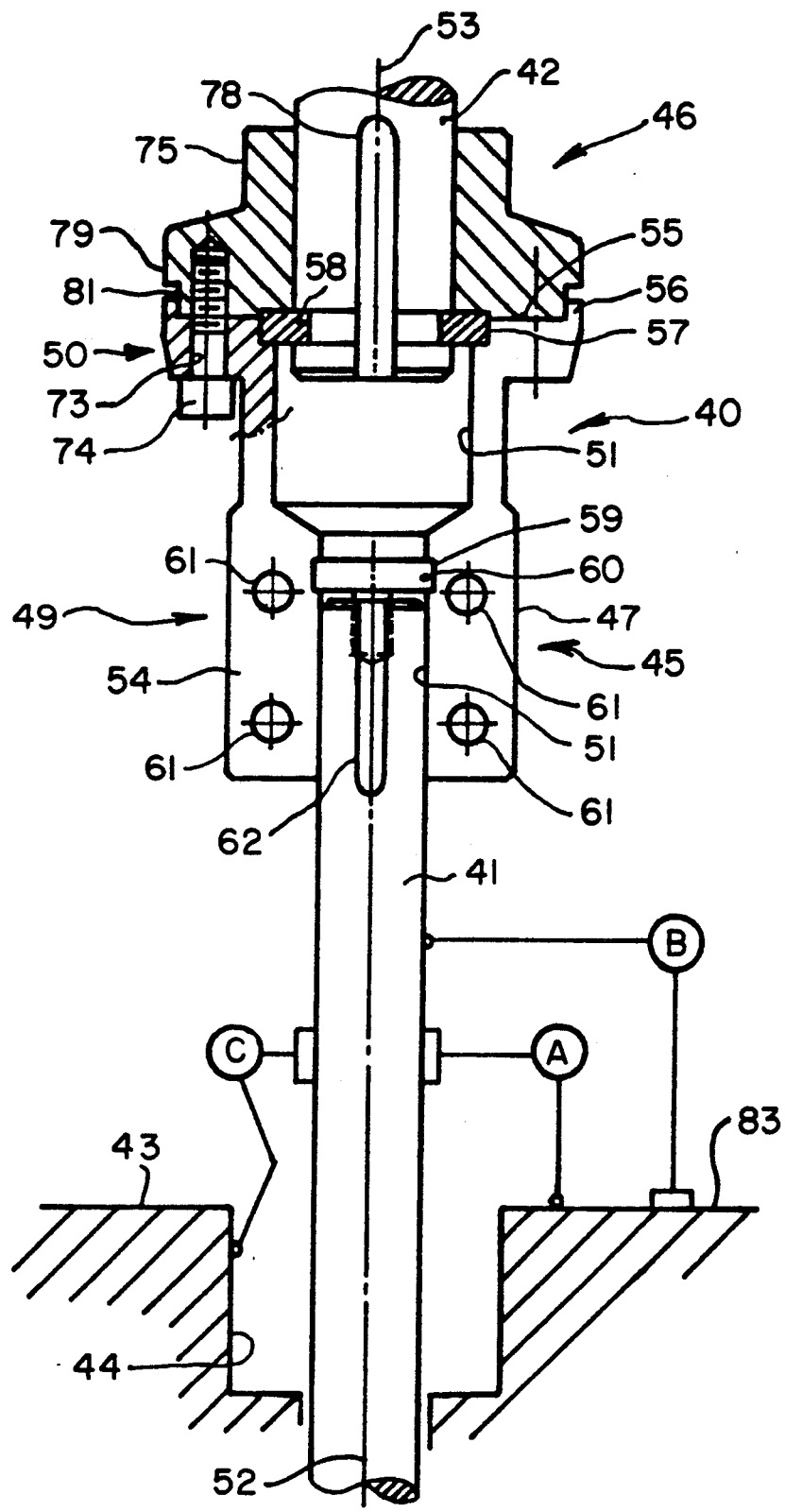
FIG. 3 is a view somewhat similar to that of FIG. 1 but showing the coupling arrangement of the present invention.
Figure 4:
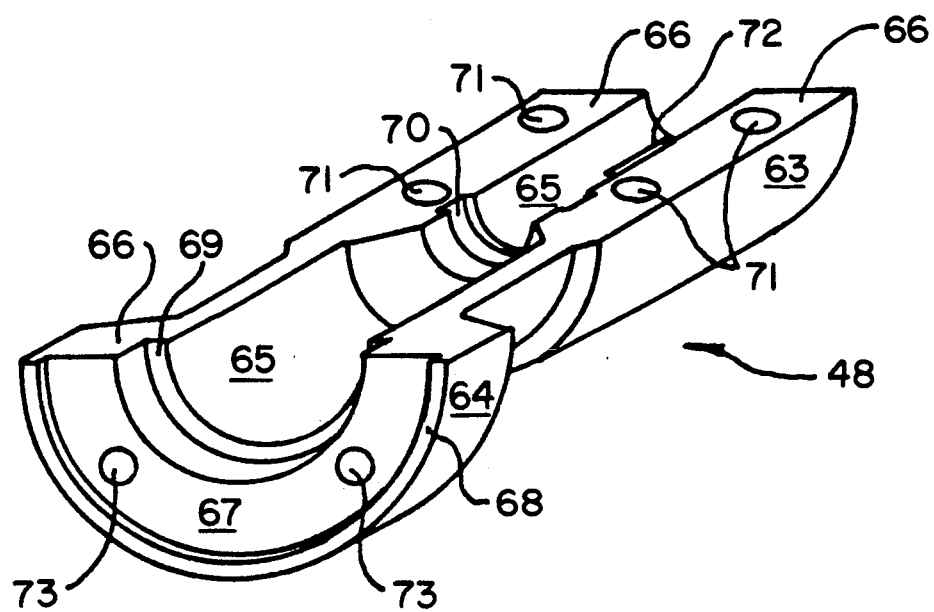
FIG. 4 is a diagrammatic perspective view of a half-muff of the present invention, forming one half of one of two coupling elements of the coupling.
Figure 5:
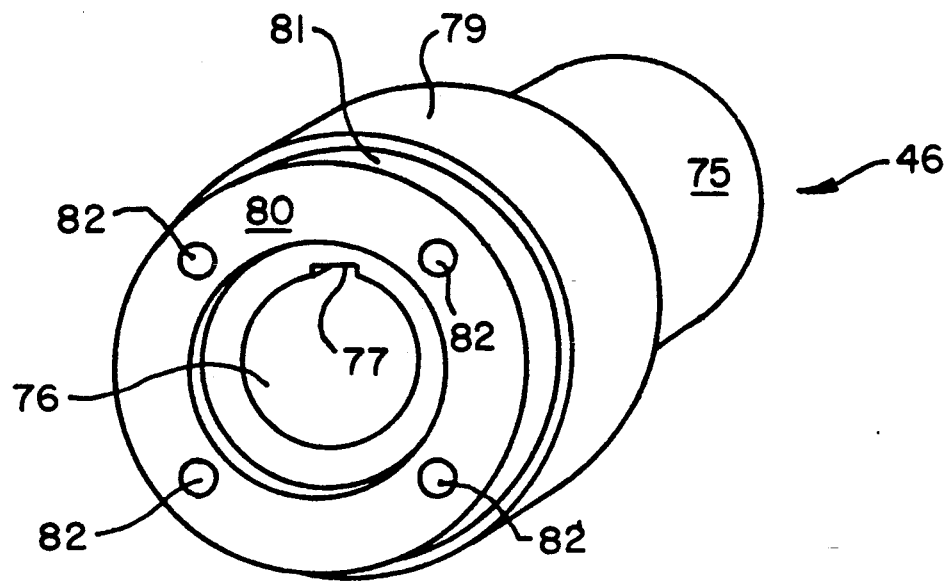
FIG. 5 is a similar perspective view showing the coupling member typically secured to the drive motor shaft when the coupling is used in pumps.

Turning now to the embodiment of the present invention as shown diagrammatically in FIGS. 3, 4 and 5, reference number 40 generally designates the shaft alignment coupling of the present invention. As mentioned above, the coupling is used in connecting a first shaft end 41 and a second shaft end 42 to each other in an axially spaced, aligned fashion. In the embodiment shown, the first shaft end 41 is the shaft of a pump having a housing 43 and a machined, hollow, cylindric well 44 for the packing elements (not shown) adapted to prevent the escape of pumped liquid from within the housing 43. The second shaft 42, on the other hand, is the shaft of a drive motor. Both the housing 43 and the drive motor (not shown) are secured to a common base, also not shown as is well known in the art of pumps.

The coupling 40 is comprised of a first coupling member 45 and a second coupling member 46. In general, the first coupling member 45 has a first half-muff 47 which is shown in FIG. 3 and a second half-muff 48 which is shown in perspective view in FIG. 4, is being understood that the first and second half-muff 47, 48 are virtually identical in structure and size as will be apparent from the following description.

The first half-muff 47 is comprised of two basic integral sections, which are designated as a first half-collar 49 and a first half flange 50. The first half collar defines a first semi-cylindric cavity 51 which has an enlarged portion in the upper part of half-muff 47 as viewed in FIG. 3, and a smaller diameter portion in the lower part as viewed in FIG. 3. The smaller diameter section is compatible with the diameter of the first shaft end 41. The first semi-cylindric cavity 51 is generally parallel with the axis 52 of the shaft 41 which, in turn, is coaxial with the axis 53 of the second shaft-end 42. The upper face of the first coupling member 45 defines a first planar longitudinal surface portion 54 which is comprised of two sections. The surface portion 54 is planar and is defined by two first longitudinal sections, one to each side of the semi-cylindric cavity 51. The first half flange 50 defines a first transverse surface portion 55 which is a planar face of the first half flange 50. An arcuate half rim 56 surrounds the first transverse surface portion 55 as can been see from FIG. 3. The transverse surface portion 55 is perpendicular to the axis 52. A shallow half groove 57 is machined in the first transverse surface portion 55. In operation, it receives, together with the corresponding half groove of the second half muff, a split thrust collar 58 which is indicated diagrammatically in FIG. 3. Another peripheral half groove 59 of the first half muff 47 is machined in the minor radius portion of the semi-cylindric cavity 51, to receive an adjustable disc 60 threaded in the free end of the shaft 41, as is well known in the art. The end of the first half muff 47 which defines the first transverse surface portion 55 is also referred to as a "first axial end" of the half muff.

The first half muff 47 also includes what is generally referred to as "first radial clamping device portion". This is a series of threaded holes 61 compatible with the threaded portion of radial clamping bolts (not shown in the drawings) for radially clamping the first half muff 47 to the shaft 41 and to the second half muff 48. The representation of FIG. 3 also shows diagrammatically a key 62 which normally engages a keyway machined in the second half muff 48.

Attention is now directed to the diagrammatic perspective view of FIG. 4 which shows that the second half muff is of a virtually identical configuration with the first half muff. As in the first half muff, there is a second half collar 63, a second half flange 64, second semi-cylindric cavity 65, second longitudinal surface portion 66, second transverse surface portion 67, second half rim portion 68, second thrust collar half groove 69 and a second half peripheral groove 70. Also, there are four clamping bolt passages 71 compatible with the threaded holes 61 shown in FIG. 3. The minor radius portion of the second semi-cylindric cavity 65 is provided with a keyway 72 which only partly visible in FIG. 4. It is compatible with the key 62 mentioned in connection with FIG. 3. The passages 71 may also be generally referred to as "second radial clamping device portion" as they combine with the threaded holes 61 (first radial clamping device portion) and with clamping bolts (not shown) to firmly clamp the half muffs to each other and to the first shaft end 41. The keyway 72, and the key 62 of course, are parts of known torque arresting device for non-rotational securement of the first coupling member to the first shaft end 41, when the coupling assembled.

The first and second half flanges 50, 64 are provided with connecting bolt passages 73 allowing the passage of bolts such as bolt 74 (FIG. 3) used in coupling the two coupling members 45, 46, to each other to secure a rigid connection between shaft ends 41 and 42.

The second coupling member 46 comprises a sleeve section 75 which defines a cylindric passage 76 compatible with the diameter of the second shaft end 42. It is also provided with suitable torque arresting device such as a keyway 77 which is compatible with the key 78 of the second shaft end 42.

The second coupling member 46 further includes a flange portion 79 which defines a planar face portion 80 perpendicular to the longitudinal axis of the second coupling member 46. The end face portion 80 is provided with four threaded holes 82 the spacing of which corresponds to the spacing of the passages 73 in the half flange portions 50, 64 of the first coupling member. The face portion 80 forms a free end section of the second coupling member 46. There is a short cylindric surface 81 which is compatible with the inner radius of the half rim portions 68, 56 to centre the two coupling members 45, 46 with each other.

When the coupling of the invention is assembled, all bolts clamping the half muffs 47, 48, i.e., the bolts passing through the passages 71 and into the threaded holes 61, are fully tightened to fully clamp the shaft end 41. Likewise, the bolts passing through passages 73 into the threaded holes 82 in the flange 79 are firmly tightened to provide a tight abutment between the planar annular faces 55–67 and 80 with the thrust washer 58 clamped between the two.

In operation, if it is discovered that the shaft 41 is not coaxial with shaft 42, unlike the known couplings of the rigid type, the coupling of the present invention facilitates the location of the inaccuracy and remedy of same.

Let it be assumed that seals are to be replaced in the well 44. This requires the disassembling of the coupling shown. However, the structural arrangement of the invention enables the disconnection of the half-muffs 47, 48 by releasing the clamping bolts (not shown, but engaged at 61 and 71) and subsequently removing the two half-muffs 47, 48 from the shaft 41, allowing convenient removal of the seals from the well 44, without having to disassemble the second coupling member 46 thus securing proper and easy realignment of the coupled shafts 41, 42.

FIG. 3 further shows the position of three dial indicators. Indicator A is fixedly secured to the shaft 41 and has its feeler point resting on a machined surface 83 of the housing 43. The surface 83 is planar and is perpendicular to the axis of the seal well 44. Indicator B is fixedly secured to the housing 43 and has its feeler on the shaft 41. Finally, indicator C is fixed to the shaft 41 and its feeler rests on the cylindric cavity of the seal well 44.

Let it now be assumed that the drive train is being manufactured or subjected to maintenance. At least a part of the inside cylindric wall of the seal well 44 is exposed for taking the reading on the indicator C.

The first step presents a checkup of whether the axis of the well 44 and the axis 53 of the drive motor are aligned. If they are, the reading at C and at A will be true regardless of the angular displacement of axis 52 from axis 53.

With the true position of axis 53 established or adjusted, as the case may be, the next step is to establish whether the axis 52 is also true. If not, a deviation will be read off at B, indicating that the axis 52 is misaligned. The misalignment can be of three kinds: angular, where the axes 53 and 52 intersect each other at an angle close to but not equal to 180°. Second, radial misalignment, where the two axes 53, 52 are parallel with, but radially spaced from each other. A combined angular/radial misalignment where the axes 53, 52 are skew lines presents the third possibility.

Each of the three misalignments results in a deviation at indicator B. As is well known, the angular deviation can be distinguished from a purely radial misalignment by taking a measurement similar to that of indicator B but made at a point spaced axially away from the point of feeler of B. If the two deviations are the same, the misalignment is purely radial. A purely radial misalignment is very rare. If different deviations are established at the axially spaced points, then an angular misalignment is clearly established.

It is the angular misalignment which was very difficult to correct in prior art couplings as the source of the misalignment was practically impossible to establish due to the fact that it was caused not so much by failure to adhere to production tolerances, as by the uneven tightening of the clamping bolts at the coupling.

In the coupling of the present invention, the only source of angular misalignment can practically be the contact between the surface portion 55 of the flange 50, 67 and the face 80 of the flange 79. Thus a corrective measure can be taken by appropriate machining of either the bottom surfaces 55, 67 or face 80. Since all bolts are firmly tightened, and all surfaces 55, 67 80 and 54, 66 abut against each other, the tightening of the bolts does not influence the accuracy of angular alignment between the surfaces 55–67 and axis 52. Nor is angular alignment influenced by the tightening a of the clamping bolts due to the abutment of surfaces 54 and 66.

Once the angular misalignment is corrected as described, the radial misalignment, if at all present, can be fixed easily since the only source of same must be the peripheral contact between the inside surface of the rim 68 and the outside cylindric surface 81.

The invention thus presents an improvement in that, unlike the old coupling, it allows a quick disassembly of the coupling of the two shafts, while substantially facilitating the correction of the angular misalignment and making the corrected alignment permanent as there is a firm metal-to-metal abutment between all parts of the coupling, contrary to the gap 22 of the prior art arrangement.

Those skilled in the art will readily appreciate that modifications can be made to the embodiment described above. While the invention is primarily suitable for use in pumps driven by electric motors, the invention can also be used in may other fields without departing from the scope of invention.

Accordingly, we wish to protect by letters patent which may issue on this application all such embodiments as properly fall within the scope of our contribution to the art.

I claim:

1. A shaft alignment coupling for rigidly connecting a first shaft end and a second shaft end in an axially spaced, aligned fashion, said coupling comprising a first coupling member and a second coupling member, said first coupling member comprising, in combination:
   a) a first half-muff which includes
      i) a first half-collar defining a generally semi-cylindrical first cavity complementary with a radius of a respective first shaft end;
      ii) a generally planar first longitudinal surface portion parallel with a longitudinal axis of said semi-cylindrical cavity and comprised of two first longitudinal sections, one along each side of the first cavity;
      iii) a first half-flange defining a generally planar first transverse surface portion perpendicular to said longitudinal axis of said semi-cylindrical cavity and disposed at a first axial end of the first half-muff;
      iv) first radial clamping device portion for allowing the clamping of said first half-muff to a second half-muff and to said first shaft end;
   b) said second half-muff including:
      i) a second half-collar defining a generally semi-cylindrical second cavity complementary with a radius of a respective first shaft end;
      ii) a generally planar second longitudinal surface portion parallel with a longitudinal axis of said semi-cylindrical cavity and comprised of two second longitudinal sections, one along each side of the second cavity;
      iii) a second half-flange defining a generally planar second transverse surface portion perpendicular to said longitudinal axis of said semi-cylindrical cavity and disposed at a first axial end of the second half-muff;
      iv) second radial clamping device portion for allowing the clamping of said second half-muff to said first half-muff and to said first shaft end;
   c) at least one of said semi-cylindrical cavities including torque arresting device for non-rotational securement of the first coupling member to the first shaft end;
   d) first connecting device provided in said first and second half-flanges for rigidly connecting the half flanges with said second coupling member;
   e) said second coupling member comprising, in combination:
      i) a generally cylindric sleeve section defining a cylindric passage, the passage having a diameter corresponding to that of the second shaft end and including torque arresting device for non-rotational securement of the second coupling member to the second shaft end;
      ii) a flange integral with the sleeve and defining a generally planar end face portion perpendicular to the axis of said cylindric passage;
   f) second connecting device provided in said flange and being complementary with said first connecting device for rigidly connecting the flange with said half flanges and thus with said first coupling member.

2. The coupling as claimed in claim 1, wherein the first and second radial clamping device portions include a plurality of clamping bolts receiving threaded holes, each disposed in one of the half-muffs, and a plurality of corresponding clamping bolt passages each disposed in the other one of the half-muffs; whereby a plurality of clamping bolts complementary with said threaded holes and said bolt passages can be used for rigidly clamping the half-muffs to each other and to the first shaft end.

3. The coupling as claimed in claim 2, wherein the half-muffs are so dimensioned that the first and second longitudinal sections of the first and second longitudinal surface portions of the half-muffs abut against each other when the half-muffs are rigidly clamped to each other and to the first shaft end.

4. The coupling as claimed in claim 1, wherein the first and second connecting device includes a plurality of connecting bolt receiving threaded holes provided in one of said the half-flanges and flange on the one hand, and, on the other hand, connecting bolt receiving passages in the other one of said half-flanges and flange; the axes of said threaded holes and of said bolt passages being each generally parallel to the axis respective semicylindrical cavity or the cylindric passage; the threaded holes and the axial bolt passages being arranged at and for being aligned with one another when the first and second coupling members are connected to each other.

5. The coupling as claimed in claim 1, wherein the coupling members are so dimensioned that the transverse surface portions on the one hand, and, on the other hand, the end face portion, abut against each other when the coupling is in a fully assembled state on the respective shaft ends.

6. The coupling as claimed in claim 5, wherein the transverse surface portions are each surrounded by an arcuate half-rim section, whereby, on clamping of the half-muffs to the first shaft end and to each other, the transverse surface portions and the half-rims form an axially projecting rim; and said end face portion being a face of a short cylindric end section of said flange, said cylindric end section having an outer diameter generally equal to the inside diameter of said rim for interfitting with same when the first and second coupling members are clamped to each other.

7. The coupling as claimed in claim 1, wherein said transverse surface portions are semi-annular in shape and the end face portion is of annular shape, a minor radius portion of at least one of the transverse surface portions on the one hand, and, on the other hand, of the end face portion, being provided with a groove complementary with a thrust washer.

* * * * *